United States Patent
Stanley et al.

(10) Patent No.: US 11,815,942 B2
(45) Date of Patent: Nov. 14, 2023

(54) SYSTEMS AND METHODS FOR EXECUTING ATTENTION-BASED OBJECT SEARCHES ON IMAGES USING NEURAL NETWORK ARCHITECTURES

(71) Applicant: Walmart Apollo, LLC, Bentonville, AR (US)

(72) Inventors: Theban Stanley, San Bruno, CA (US); Nihar Vanjara, San Jose, CA (US); Yanxin Pan, Sunnyvale, CA (US); Abon Chaudhuri, Sunnyvale, CA (US); Nikash Walia, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 54 days.

(21) Appl. No.: 17/694,517

(22) Filed: Mar. 14, 2022

(65) Prior Publication Data

US 2022/0292129 A1 Sep. 15, 2022

Related U.S. Application Data

(60) Provisional application No. 63/160,856, filed on Mar. 14, 2021.

(51) Int. Cl.
*G06F 16/53* (2019.01)
*G06N 3/08* (2023.01)

(52) U.S. Cl.
CPC .............. *G06F 16/53* (2019.01); *G06N 3/08* (2013.01)

(58) Field of Classification Search
CPC .......... G06F 16/53; G06N 3/08; G06N 3/045; G06N 3/063
See application file for complete search history.

(56) References Cited

U.S. PATENT DOCUMENTS 9,858,496 B2   1/2018  Sun et al.
2006/0155398 A1*  7/2006  Hoffberg ............ G06V 40/103
                                                                    700/86

(Continued)

OTHER PUBLICATIONS

Shih, K., et al., "Real-Time Object Detection With Reduced Region Proposal Network via Multi-Feature Concatenation," IEEE Transactions on Neural Networks and Learning Systems, 10 pages Jul. 5, 2019.

(Continued)

*Primary Examiner* — Angelica Ruiz
(74) *Attorney, Agent, or Firm* — BRYAN CAVE LEIGHTON PAISNER LLP

(57) ABSTRACT

A systems including one or more processors and one or more non-transitory storage devices storing computing instructions configured to run on the one or more processors and perform acts of: receiving a query image comprising at least one target object and at least one candidate image; generating a plurality of proposals based on the at least one candidate image; selecting a portion of the plurality of proposals to produce a reduced proposal set; generating a query embedding corresponding to the query image; generating candidate embeddings corresponding to the portion of the plurality of proposals included in the reduced proposal set; computing similarity scores for the portion of the plurality of proposals; and comparing the similarity scores to a threshold to determine if the at least one candidate image comprises the at least one target object. Other embodiments are disclosed herein.

20 Claims, 5 Drawing Sheets

(56) References Cited

U.S. PATENT DOCUMENTS

| | | | |
|---|---|---|---|
| 2014/0201836 A1* | 7/2014 | Amsler | H04L 63/20 |
| | | | 726/23 |
| 2019/0072977 A1 | 3/2019 | Jeon | |
| 2019/0354609 A1 | 11/2019 | Huang et al. | |
| 2020/0210647 A1* | 7/2020 | Panuganty | G06N 20/10 |
| 2022/0319047 A1* | 10/2022 | Urtasun | G06F 18/22 |

* cited by examiner

500

| 510– Receive, at a neural network architecture, a query image comprising at least one target object |

↓

| 520– Receive, at a neural network architecture, at least one candidate image |

↓

| 530– Generate, using a region proposal network of the neural network architecture, a plurality of proposals based on the at least one candidate image |

↓

| 540– Select, using a proposal selection model of the neural network architecture, a portion of the plurality of proposals to produce a reduced proposal set |

↓

| 550- Generate a query embedding corresponding to the query image |

↓

| 560- Generate candidate embeddings corresponding to the proposals included in the reduced proposal set |

↓

| 570- Compute similarity scores for the proposals included in the reduced proposal set based on a comparison of the query embedding to each of the candidate embeddings |

↓

| 580- Compare the similarity scores to a threshold to determine if the at least one candidate image comprises the at least one target object |

FIG. 5

SYSTEMS AND METHODS FOR EXECUTING ATTENTION-BASED OBJECT SEARCHES ON IMAGES USING NEURAL NETWORK ARCHITECTURES

CROSS-REFERENCE TO RELATED APPLICATIONS

This application claims priority to U.S. Provisional Application No. 63/160,856, filed Mar. 14, 2021. U.S. Provisional Application No. 63/160,856 is incorporated herein by reference in its entirety.

TECHNICAL FIELD

This disclosure relates generally to systems, methods, and techniques for detecting objects in images using neural network architectures.

BACKGROUND

Electronic platforms can store large numbers of images (e.g., hundreds of thousands or millions of images). These images may be provided in connection with items (e.g., products and/or services) that are offered on the electronic platform. Some of the images may include content that does not comply with policies or guidelines set forth by the providers of the electronic platform, and the providers may desire to detect and remove these images.

Configuring a computer vision application or artificial neural network to identify target images desired for removal can be technically challenging. For example, one technical challenge relates to accurately recognizing whether or not images include the content desired to be removed from the electronic platform. This challenge can be particularly difficult in situations where large intra-class variations exist (e.g., in shape, size, aspect ratio, etc.), and the computer vision application or artificial neural network is expected to accurately identify the target content across all applicable images. Additionally, because computer vision applications and artificial neural networks tend to be computationally expensive and resource-intensive, additional challenges involve performing the detection techniques in a manner that is computationally efficient. In scenarios in which an electronic platform stores millions of images, many traditional detection techniques cannot identify target images in a reasonable time due to the computational resources which may be involved.

BRIEF DESCRIPTION OF THE DRAWINGS

To facilitate further description of the embodiments, the following drawings are provided in which:

FIG. 5 illustrates a flowchart for a method, according to certain embodiments.

Figure 1:
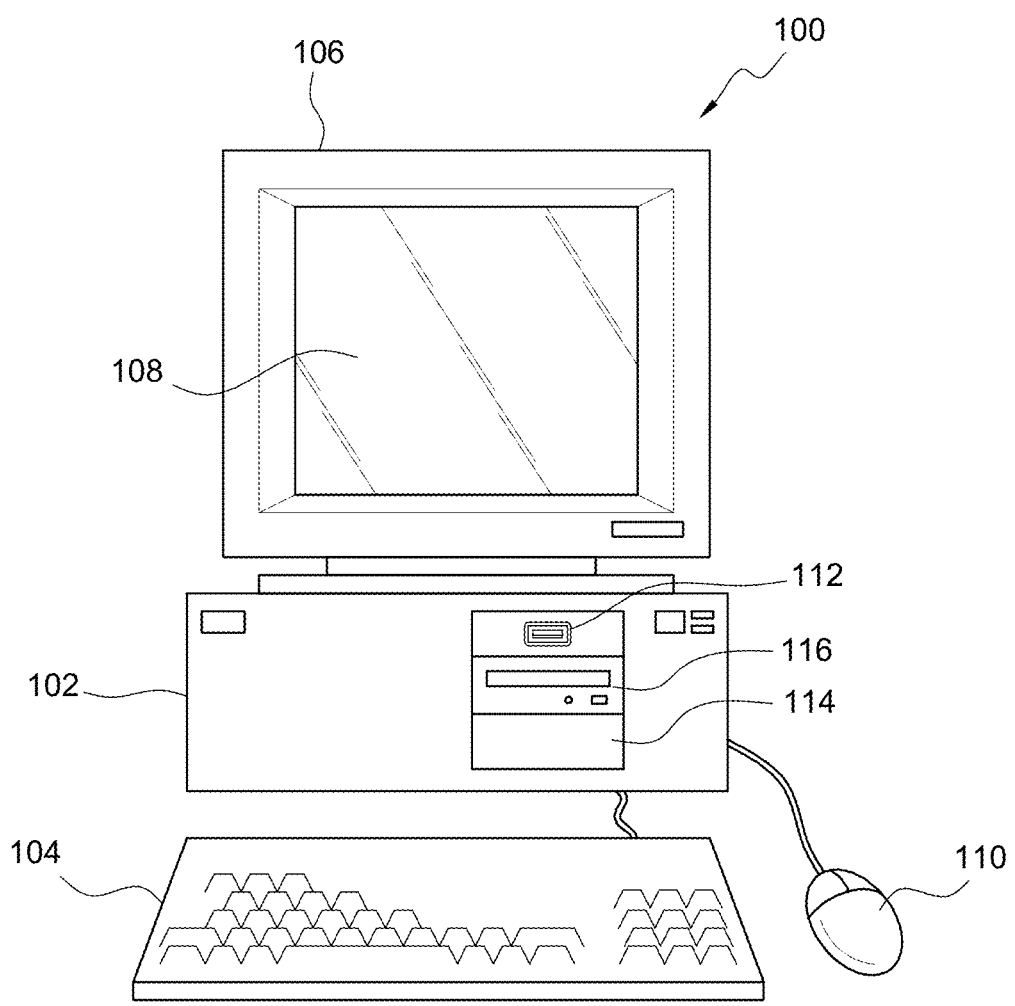
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform functions of: receiving, at the neural network architecture, at least one candidate image; generating, using a region proposal network of the neural network architecture, a plurality of proposals based on the at least one candidate image; selecting, using a proposal selection model of the neural network architecture, a portion of the plurality of proposals to produce a reduced proposal set; generating a query embedding corresponding to the query image; generating candidate embeddings corresponding to the portion of the plurality of proposals included in the reduced proposal set; computing similarity scores for the portion of the plurality of proposals included in the reduced proposal set based on comparisons of the query embedding to each of the candidate embeddings; and comparing the similarity scores to a threshold to determine if the at least one candidate image comprises the at least one target object.

Various embodiments include a method. The method can be implemented via execution of computing instructions configured to run at one or more processors and configured to be stored at non-transitory computer-readable media The method can comprise: receiving, at the neural network architecture, at least one candidate image; generating, using a region proposal network of the neural network architecture, a plurality of proposals based on the at least one candidate image; selecting, using a proposal selection model of the neural network architecture, a portion of the plurality of proposals to produce a reduced proposal set; generating a query embedding corresponding to the query image; generating candidate embeddings corresponding to the portion of the plurality of proposals included in the reduced proposal set; computing similarity scores for the portion of the plurality of proposals included in the reduced proposal set based on comparisons of the query embedding to each of the candidate embeddings; and comparing the similarity scores to a threshold to determine if the at least one candidate image comprises the at least one target object.

Figure 2:
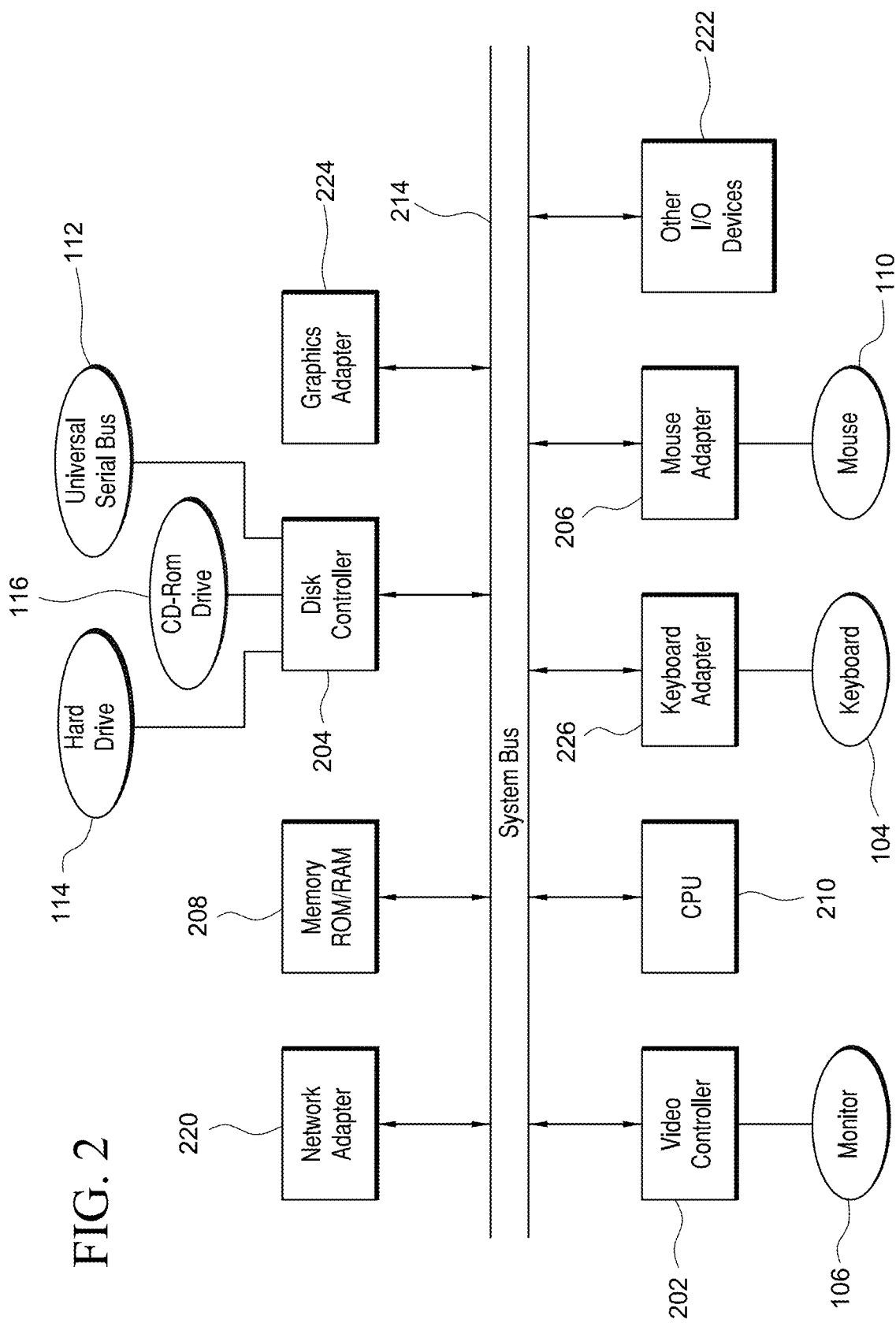
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
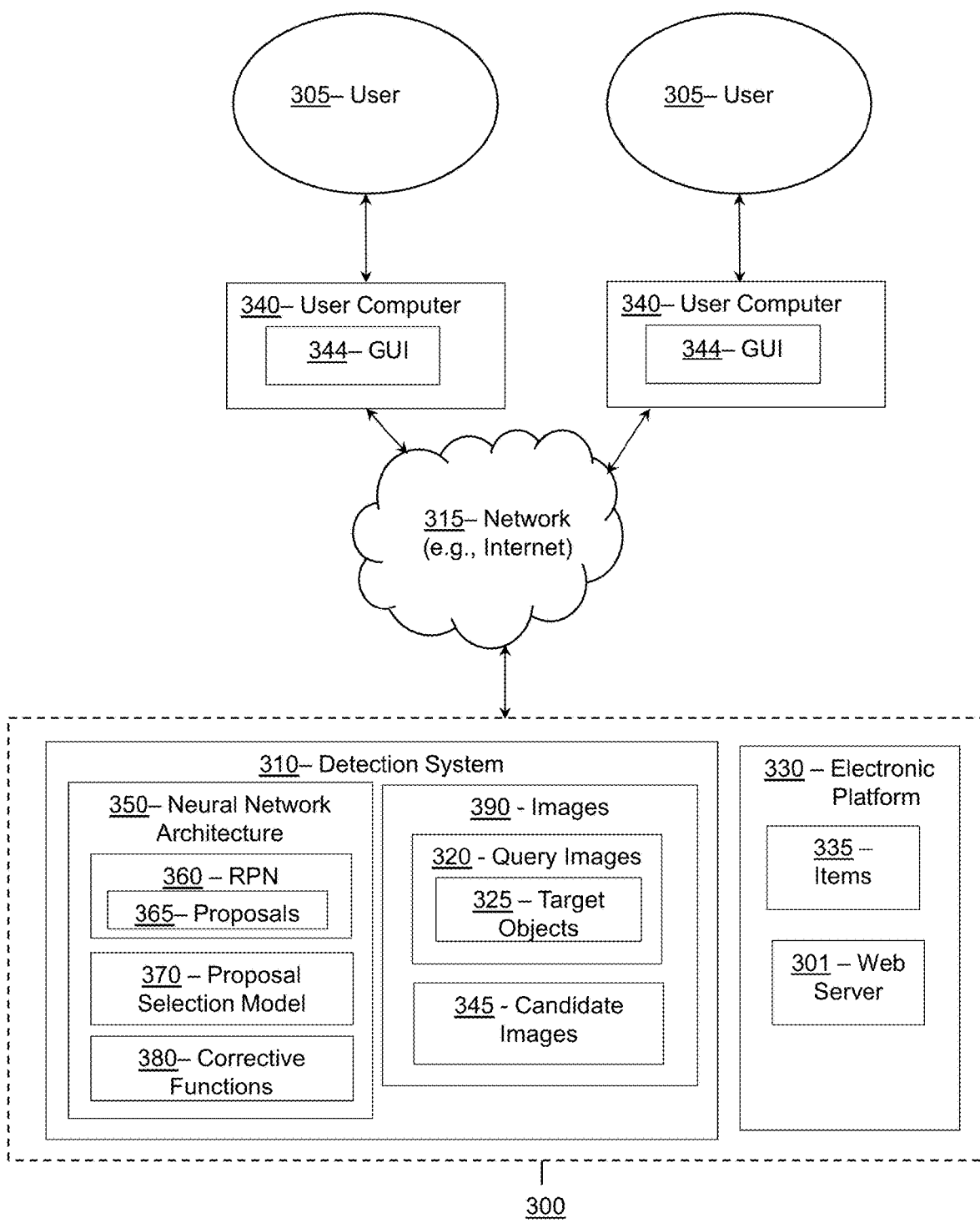
FIG. 3 illustrates a representative block diagram of a system, according to an embodiment.

Turning ahead in the drawings, FIG. 3 illustrates a block diagram of a system 300 that can be employed for detecting objects in images using neural network architectures, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a detection system 310, a neural network architecture 350, and an electronic platform 330. Detection system 310, neural network architecture 350, and an electronic platform 330 can each be a computer system, such as computer system 100 (FIG. 1), as described above, and can each be a single computer, a single server, or a cluster or collection of computers or servers, or a cloud of computers or servers. In another embodiment, a single computer system can host each of two or more of detection system 310, neural network architecture 350, and/or electronic platform 330. Additional details regarding detection system 310, neural network architecture 350, and/or electronic platform 330 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interfaces ("GUIs") 344. In the same or different embodiments, GUIs 344 can be part of and/or displayed by computing devices associated with system 300 and/or user computers 340, which also can be part of system 300. In some embodiments, GUIs 344 can comprise text and/or graphics (images) based user interfaces. In the same or different embodiments, GUIs 344 can comprise a heads up display ("HUD"). When GUIs 344 comprise a HUD, GUIs 344 can be projected onto glass or plastic, displayed in midair as a hologram, or displayed on monitor 106 (FIG. 1). In various embodiments, GUIs 344 can be color or black and white. In many embodiments, GUIs 344 can comprise an application running on a computer system, such as computer system 100, user computers 340, and/or one or more server computers (e.g., server computers that host system 300). In the same or different embodiments, GUI 344 can comprise a website accessed through network 315 (e.g., the Internet). In some embodiments, GUI 344 can comprise an eCommerce website. In the same or different embodiments, GUI 344 can be displayed as or on a virtual reality (VR) and/or augmented reality (AR) system or display.

In some embodiments, web server 301 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 301 can host one or more websites. For example, web server 301 can host an eCommerce website that allows users to browse and/or search for products, to add products to an electronic shopping cart, and/or to purchase products, in addition to other suitable activities.

In many embodiments, detection system 310, neural network architecture 350, and/or electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) detection system 310, neural network architecture 350, and/or electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of detection system 310, neural network architecture 350, and/or electronic platform 330. In a similar manner, the processing module(s) and the memory storage module(s) can be local and/or remote to each other.

In many embodiments, detection system 310, neural network architecture 350, and/or electronic platform 330 can be configured to communicate with one or more user computers 340. In some embodiments, user computers 340 also can be referred to as customer computers. In some embodiments, detection system 310, neural network architecture 350, and/or electronic platform 330 can communicate or interface (e.g., interact) with one or more customer computers (such as user computers 340) through a network 315 (e.g., the Internet). Network 315 can be an intranet that is not open to the public. Accordingly, in many embodiments, detection system 310, neural network architecture 350, and/or electronic platform 330 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, detection system 310, neural network architecture 350, and/or electronic platform 330 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between detection system 310, neural network architecture 350, and/or electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, the electronic platform 330 is configured to provide a website for an online retailer or online shopping site that enables users 305 to browse items 335 (e.g., products and/or services), place orders, make purchases, access online accounts, and perform other related activities over the network 315. The electronic platform 330 includes a database that stores information associated with the items 335, as well as images 390 corresponding to the items 335. The items 335 made available via the electronic platform 330 may generally relate to any type of product and/or service including, but not limited to, products and/or services associated with groceries, household products, entertainment, furniture, apparel, kitchenware, electronics, fashion, appliances, sporting goods, etc. When users 305 access the website hosted by the electronic platform 330, the electronic platform 330 can display the items 335, as well as images 390 associated with the products and/or services associated with the items 334.

Detection system 310 can be configured to perform functions associated with detecting images 390 that include target objects 325 and executing corrective functions 380 for controlling access to images 390 that include target objects 325 (e.g., removing the images 390 and/or restricting access to the images 390). The types of target objects 325 can vary greatly, and can generally include any content that an individual or entity desires to identify and/or remove from the electronic platform 330. In some embodiments, the target objects 325 pertain to content that is not compliant with policies associated with the electronic platform 330 (e.g., offensive content and/or content that does not comply with policies associated with a provider of the electronic platform 330). For example, in certain embodiments, the target objects 325 can include content that is determined to be offensive, crude, hateful, and/or distasteful. In some cases, the target objects 325 in the images 375 can include other types of non-compliant content.

In certain embodiments, the detection system 310 may display one or more GUIs 344 that permit users to search images 390 included on the electronic platform 330 for the presence of target objects 325. Users 305 can upload, identify, and/or provide query images 320 that include the target objects 325 (e.g., which may include objects or content desired to be removed from the electronic platform 330 in some cases). In some cases, the query images 320 can include annotations (e.g., bounding boxes, pixel-level annotations, and/or other annotations) that identify the target objects 325. Upon receiving a query image 320, the detection system 310 can analyze one or more candidate images 345 to determine if the candidate images 345 include the target objects 325. In some cases, the candidate images 345 may represent all of the images 390 included on the electronic platform 330. In other cases, the candidate images 345 can represent a subset of the images 390 stored on the electronic platform 330 (e.g., particular subsets of images pertaining to particular categories of items 335, such as apparel, toys, etc.). Users can be presented with options on the GUI 344 for selecting and/or identifying the candidate images 345.

The detection system 310 can store and execute various functions for detecting target objects 325 in the images 390 (e.g., candidate images 345). In certain embodiments, the detection system 310 comprises a neural network architecture 350 that is configured to detect the target objects 325 in the images 390. Generally speaking, any type of neural network architecture 350 can be employed to detect target objects 325 in the images 390 and the configuration of the neural network architecture 350 can vary.

In certain embodiments, the neural network architecture 350 can comprise one or more neural networks that are configured and/or trained to detect target objects 325 in the images 390 (e.g., in one or more candidate images 345). The neural networks can be implemented as convolutional neural networks (CNNs) in certain embodiments. Each neural network can be configured to analyze images 390 and execute deep learning functions and/or machine learning functions on the images 390. Each neural network can include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more detection layers, one or more upsampling layers, one or more normalization layers, etc. The configurations of the neural networks and their corresponding layers enable the neural networks to learn and execute various functions for analyzing, interpreting, and understanding the content of the images 390. The functions learned by the neural networks, or other neural network structures, can include computer vision functions that involve object detection. In some cases, the neural networks also may learn functions for performing object classification and/or image classification. Appropriate loss functions can be tailored to optimize the neural networks during training. The functions learned by the neural network architecture 350 can be utilized detect target objects 325 (e.g., non-compliant content) in the images 390.

In certain embodiments, the neural network architecture 350 includes a Faster R-CNN (region-based convolutional neural network) that can be configured to perform object detection functions and/or functions that assist with detecting target objects 325. As described in further detail below, the Faster R-CNN can be adapted or modified to process large numbers of images 390 quickly and efficiently. The Faster R-CNN is just one example of an object detection model that can be used to implement the present techniques. Other types of object detection models also can be utilized, and the object detection models can be configured to perform similar techniques to detect target objects 325.

Many electronic platforms 330 store large numbers of images 390 associated with providing items 335. The number of images 390 stored on these platforms can be in the thousands or millions and, in some cases, can even exceed 100,000,000. This large number of images 390 can create technical obstacles for detecting target objects 325 in the images 390. One technical obstacle relates to the time and computational resources involved to detect target objects 325 across such large data collections. Due to the large size of the data collection, the time and processing involved to analyze all of the images 390 can be very expensive and, in many cases, prohibitive.

In many embodiments, the neural network architecture 350 includes a region proposal network (RPN) 360. Upon receiving a query image 320 comprising a target object 325, the region proposal network 360 can be configured to generate a plurality of proposals 365 for each candidate image 345. The proposals 365 derived from a candidate image 345 can include or predict regions of the candidate image 345 that potentially include the target object 325.

In many cases, significant delays and resource consumption can be attributed the manner in which a traditional region proposal network operates to detect target objects. For example, for each candidate image, a traditional region proposal network can generate over three hundred proposals. These proposals are then processed by a layer (e.g., a RoI pooling layer) that performs classification functions on the proposals. Analyzing millions of images, each of which include hundreds of proposals, in this manner can be create a computational bottleneck that significantly increases processing time and resources.

In certain embodiments, the region proposal network 360 of the neural network architecture 350 can be specifically configured to address these and other technical concerns. Rather than processing the proposals 365 with classifier layer, the region proposal network 360 bypasses this layer and utilizes a proposal selection model 370 to prune or reduce the number of proposals 365.

In certain embodiments, the proposal selection model 370 can be trained to learn normal distributions for proposals 365 generated by the region proposal network 360. The proposal selection model 370 may be trained using a training set of images to learn the normal distributions of proposals 365 with respect to the location, area, and aspect ratio of the proposals 365. In many cases, the training set does not include images that are specific to a particular detection task (e.g., does not include specific target objects 325) because the target objects may be unknown at the time training and/or because sufficient images are not available with target objects 325. Rather, the training set can include random images that can be useful for learning the normal distributions of the proposals parameters and/or training the attention mechanism of the proposal selection model 370.

During inference, the proposal selection model 370 utilizes the learned distributions to select a subset set of the proposals 365 generated by the region proposal network 360 for analysis. In some cases, the number proposals 365 selected for analysis can be 50-75% less (e.g., 75-150 proposals 365) than would typically be used by a traditional region proposal network. The distributions learned by the proposal selection model 370 can be used to select the best proposals 365 generated from each candidate image 345. Upon analyzing the selected subset of proposals 365 for a candidate image 345, the detection system 310 can determine whether or not the candidate image 345 includes a target object 325. Additional details describing how the proposal selection model 370 and/or the detection system 310 can perform these functions are described in further detail below.

In response to detecting a target object 325 in one or more images 390 included on the electronic platform 330, the detection system 310 can execute one or more corrective functions 380. In certain embodiments, these corrective functions 380 can include removing or deleting the images 390 with target objects 325 from a database and/or the electronic platform 330. The corrective functions 380 can additionally, or alternatively, include preventing the image 390 from being accessible on the electronic platform 330, flagging the images 390 for human review, and/or preventing items 335 associated with the images 390 from being accessed on the electronic platform 330. Other types of corrective functions 380 also be executed.

Figure 4:
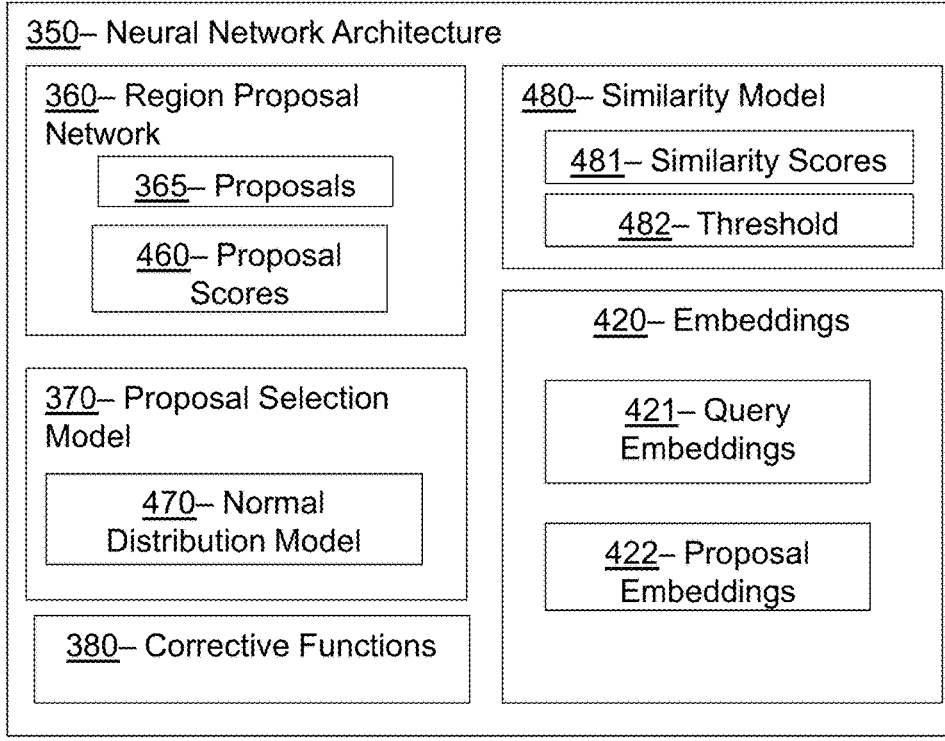
FIG. 4 illustrates a representative block diagram of a portion of the system of FIG. 3, according to an embodiment.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing detection system 310, neural network architecture 350 (and associated sub-components), and/or electronic platform 330. The one or more processing modules 402 can be configured to execute any and all instructions associated with implementing the functions performed by these components. Exemplary configurations for each of these components are described in further detail below.

A database 410 stores a plurality of images 390. The images 390 stored in the database 410 can include any or all of the candidate images 345 and/or query images 320.

In this exemplary embodiment, the detection system 310 includes a region proposal network 360, a proposal selection model 370, and a similarity model 480 that assist the detection system 310 with identifying candidate images 345 that include target objects 325.

As mentioned above, the proposal selection model 370 of the neural network architecture 350 can include a normal distribution model 470 that learns normal distributions of various parameters pertaining to the proposals 365. For example, in certain cases, the normal distribution model 470 can learn distributions for proposal locations (e.g., locations in an image 390), proposal area (e.g., the sizes and/or dimensions of the proposals 365), and/or proposal aspect ratios (e.g., the ratios of the width to the height of the proposals 365). Using these learned distributions, the normal distribution model 470 can eliminate 50-75% of the proposals generated by the region proposal network 360. The other 25-50% of the proposals 365 can then be stored and at least a portion of them can be utilized for analysis to detect target objects 325.

In certain embodiments, the region proposal network 360 can assign proposal scores 460 to each of the proposals 365 generated, including the proposals 365 that are selected by the normal distribution model 470. Each proposal score 460 may indicate a likelihood that a corresponding proposal 365 includes or contains an object (as opposed to a background portion of an image 390). In some cases, the proposal scores 460 may represent a number between zero and one, where higher proposal scores 460 indicate a higher likelihood a proposal 365 includes an object and lower scores indicate a lower likelihood a proposal 365 includes an object.

After the proposal selection model 370 selects a subset of the proposals 365 for analysis, the proposals 365 can be sorted and/or ordered based on their proposal scores 460. Then, the proposal selection model 370 (or other component of the detection system 310) can further eliminate or reduce the number of proposals 365 by selecting a predetermined number (e.g., 5, 10, or 20 proposals) of proposals from the subset of proposals 365. For example, in some cases, the top ten proposals 365 having the best proposal scores 460 can be selected for analysis.

This pruning technique employed by the proposal selection model 370 can significantly minimize the time and resources involved to analyze large quantities of images 390 on the electronic platform 330. Additionally, because the proposals are selected based on both the distributions and proposal scores 460, the detection system 310 is able to accurately detect target objects 325.

In response to a user submitting a query image 320 that includes a target object 325, the detection system 310 can generate embeddings 420 for both the query image 320 and each of the proposals 365 selected for analysis (e.g., the top ten proposals selected based on their distributions and proposal scores 460). For example, a query embedding 421 can be generated based on the query image 320 and/or based on the target object 425 included in the query image 320, and a plurality of proposal embeddings 422 can be generated for each of the selected proposals 365.

Each of the query embeddings 421 and proposal embeddings 422 generated by the detection system 310 can represent a vector and/or numerical sequence that describes and/or reflects the salient features of the query images 320 and the proposals 365 associated with candidate images 345. The query embeddings 421 and proposal embeddings 422 can serve as fingerprints for the query images 320 and proposals 365.

After a query embedding 421 and multiple proposal embeddings 422 are generated for a given query submitted by a user, a similarity model 480 of the neural network architecture 350 can compare each of the proposal embeddings 422 to the query embedding 421 and/or to determine a similarity between each of the proposal embeddings 422 and the query embedding 421.

In certain embodiments, the similarity model 480 may be implemented with a version of a VGG (Visual Geometry Group) neural network (e.g., such as VGG-16), which can be a convolutional neural network that trained to perform object detection tasks. Other types of neural networks and/or learning models also can be utilized to perform the functions of the similarity model 480.

Regardless of how the similarity model 480 is implemented, the similarity model 480 can generate similarity scores 481 based on a comparison of each selected proposal embedding 422 and the query embedding 421. Each similarity score 481 indicates a similarity between the query embedding 421 and a corresponding proposal 365 (e.g., or associated proposal embedding 422). In some cases, each similarity score 481 may represent a number between zero and one, where higher similarity scores 481 indicate a higher similarity and lower similarity scores 481 indicate a lower similarity.

The similarity model 480 can compare each of the similarity scores 481 to a predetermined threshold 482. The threshold 482 can represent any number or value that can be used to predict whether a proposal 365 includes a target object 325 associated with a query image 320. For example, in some cases, the threshold 482 may be set to 0.5, 0.8, or 0.9.

If any of the similarity scores 481 associated with the selected proposal embeddings 422 exceed the threshold 482, the similarity model 480 (or other component of the detection system 310) can determine that the corresponding candidate image 345 (from which the proposal embeddings 422 were derived) includes the target object 325 included in the query image 320. Conversely, if none of the proposal embeddings 422 exceed the threshold 482, the similarity model 480 (or other component of the detection system 310) can determine that the corresponding candidate image 345 does not include the target object 325 included in the query image 320. This determination can be made for each of the candidate images 345 that are being analyzed by the detection system 310.

As mentioned above, the detection system 310 can execute various corrective functions 380 in response to determining that a candidate image 345 includes a target object 325. Exemplary corrective functions 380 may include deleting the candidate image 345, flagging the candidate image 345 for human review, and/or removing an item 335 associated with the candidate image 345 from the electronic platform 330.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIGS. 3-4) and/or detection system 310 (FIGS. 3-4) can be suitable to perform method 500 and/or one or more of the activities of method 500. In these or other embodiments, one or more of the activities of method 700 can be implemented as one or more computer instructions configured to run at one or more processing modules 402 (FIG. 4) and configured to be stored at one or more non-transitory memory storage modules 401 (FIG. 4). Such non-transitory memory storage modules 401 (FIG. 4) can be part of a computer system such as system 300 (FIGS. 3-4), detection system 310 (FIGS. 3 & 4), and/or electronic platform 330 (FIGS. 3 & 4). The processing module(s) also can be similar or identical to the processing module(s) described above with respect to computer system 100 (FIG. 1).

In certain embodiments, method 500 can comprise an activity 510 of receiving, at a neural network architecture, a query image comprising at least one target object.

In certain embodiments, method 500 can comprise an activity 520 of receiving, at the neural network architecture, at least one candidate image.

In certain embodiments, method 500 can comprise an activity 530 of generating, using a region proposal network of the neural network architecture, a plurality of proposals based on the at least one candidate image.

In certain embodiments, method 500 can comprise an activity 540 of selecting, using a proposal selection model of the neural network architecture, a portion of the plurality of proposals to produce a reduced proposal set.

In certain embodiments, method 500 can comprise an activity 550 of generating a query embedding corresponding to the query image.

In certain embodiments, method 500 can comprise an activity 560 of generating candidate embeddings corresponding to the proposals included in the reduced proposal set.

In certain embodiments, method 500 can comprise an activity 570 of computing similarity scores for the proposals included in the reduced proposal set based on a comparison of the query embedding to each of the candidate embeddings.

In certain embodiments, method 500 can comprise an activity 580 of comparing the similarity scores to a threshold to determine if the at least one candidate image comprises the at least one target object.

In response to detecting a target object in at least one candidate image, one or more corrective functions can be executed (e.g., to remove or restrict access to the candidate image and/or item associated with the image) for displaying a web page.

As evidenced by the disclosure herein, the techniques set forth in this disclosure are rooted in computer technologies that overcome existing problems in known computer vision systems, specifically problems dealing with performing object detection functions on large collections of images. The techniques described in this disclosure provide a technical solution (e.g., one that utilizes various AI-based neural networking and/or machine learning techniques) for overcoming these obstacles. For example, the image analysis techniques described herein take advantage of artificial intelligence and machine learning techniques to learn distributions of proposals, and to utilize these learned distributions to reduce a set of proposals. Moreover, in certain embodiments, these functions can be executed to process large datasets by selecting optimal proposals based on proposal scores and the learned distributions. This technology-based solution marks an improvement over existing capabilities and functionalities related to computer vision systems by improving the speed and reducing the resources used to accurately identify target objects in large data collections.

In certain embodiments, the techniques described herein can advantageously improve user experiences with electronic platforms by quickly identifying images having target objects with high accuracy. In various embodiments, the techniques described herein can be executed dynamically in real time by an electronic platform. In many embodiments, the techniques described herein can be used continuously at a scale that cannot be reasonably performed using manual techniques or the human mind (e.g., due to the large numbers of images, and complex operations executed by the machine learning architecture). The data analyzed by the machine learning techniques described herein can be too large to be analyzed using manual techniques.

Furthermore, in a number of embodiments, the techniques described herein can solve a technical problem that arises only within the realm of computer networks, because machine learning does not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 5 may include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable storage devices storing computing instructions configured to run on the one or more processors and perform acts of:
receiving, at a neural network architecture, a query image comprising at least one target object;
receiving, at the neural network architecture, at least one candidate image;
generating, using a region proposal network of the neural network architecture, a plurality of proposals based on the at least one candidate image;
selecting, using a proposal selection model of the neural network architecture, a portion of the plurality of proposals to produce a reduced proposal set;
generating a query embedding corresponding to the query image;
generating candidate embeddings corresponding to the portion of the plurality of proposals included in the reduced proposal set;
computing similarity scores for the portion of the plurality of proposals included in the reduced proposal set based on comparisons of the query embedding to each of the candidate embeddings; and
comparing the similarity scores to a threshold to determine if the at least one candidate image comprises the at least one target object.

2. The system of claim 1, wherein:
one or more corrective functions are executed in response to determining that the at least one candidate image comprises the at least one target object.

3. The system of claim 2, wherein:
the one or more corrective functions include at least one of:
removing the at least one candidate image from an electronic platform;
restricting access to the at least one candidate image on the electronic platform; or
flagging the at least one candidate image for review.

4. The system of claim 1, wherein:
the proposal selection model utilizes a normal distribution model to select the portion of the plurality of proposals; and
the normal distribution model is trained to learn normal distributions associated with the plurality of proposals.

5. The system of claim 1, wherein:
the neural network architecture accelerates analysis of the at least one candidate image, at least in part, by limiting analysis to the portion of the plurality of proposals selected using the proposal selection model.

6. The system of claim 1, wherein the region proposal network assigns proposal scores to the plurality of proposals.

7. The system of claim 1, wherein:
after the proposal selection model selects the portion of the plurality of proposals, the portion of the plurality of proposals are sorted based on their corresponding proposal scores; and
the portion of the plurality of proposals having greatest proposal scores are selected for computing the similarity scores.

8. The system of claim 7, wherein:
the neural network architecture accelerates analysis of the at least one candidate image, at least in part, by limiting analysis to the portion of the plurality of proposals having the greatest proposal scores.

9. The system of claim 1, wherein:
the neural network architecture receives a plurality of candidate images;
the plurality of candidate images are associated with items offered through an electronic platform; and
the neural network architecture analyzes the plurality of candidate images to determine if any of the plurality of candidate images include the at least one target object.

10. The system of claim 1, wherein:
the portion of the plurality of proposals selected by the proposal selection model is approximately 25-50% of the plurality of proposals.

11. A method implemented via execution of computing instructions configured to run at one or more processors and configured to be stored at non-transitory computer-readable media, the method comprising:
receiving, at a neural network architecture, a query image comprising at least one target object;
receiving, at the neural network architecture, at least one candidate image;
generating, using a region proposal network of the neural network architecture, a plurality of proposals based on the at least one candidate image;
selecting, using a proposal selection model of the neural network architecture, a portion of the plurality of proposals to produce a reduced proposal set;
generating a query embedding corresponding to the query image;
generating candidate embeddings corresponding to the portion of the plurality of proposals included in the reduced proposal set;
computing similarity scores for the portion of the plurality of proposals included in the reduced proposal set based on comparisons of the query embedding to each of the candidate embeddings; and
comparing the similarity scores to a threshold to determine if the at least one candidate image comprises the at least one target object.

12. The method of claim 11, wherein:
one or more corrective functions are executed in response to determining that the at least one candidate image comprises the at least one target object.

13. The method of claim 12, wherein:
the one or more corrective functions include at least one of:
removing the at least one candidate image from an electronic platform;
restricting access to the at least one candidate image on the electronic platform; or
flagging the at least one candidate image for review.

14. The method of claim 11, wherein:
the proposal selection model utilizes a normal distribution model to select the portion of the plurality of proposals; and
the normal distribution model is trained to learn normal distributions associated with the plurality of proposals.

15. The method of claim 11, wherein:
the neural network architecture accelerates analysis of the at least one candidate image, at least in part, by limiting analysis to the portion of the plurality of proposals selected using the proposal selection model.

16. The method of claim 11, wherein the region proposal network assigns proposal scores to the plurality of proposals.

17. The method of claim 11, wherein:
after the proposal selection model selects the portion of the plurality of proposals,
the portion of the plurality of proposals are sorted based on their corresponding proposal scores; and
the portion of the plurality of proposals having greatest proposal scores are selected for computing the similarity scores.

18. The method of claim 17, wherein:
the neural network architecture accelerates analysis of the at least one candidate image, at least in part, by limiting analysis to the portion of the plurality of proposals having the greatest proposal scores.

19. The method of claim 11, wherein:
the neural network architecture receives a plurality of candidate images;
the plurality of candidate images are associated with items offered through an electronic platform; and
the neural network architecture analyzes the plurality of candidate images to determine if any of the plurality of candidate images include the at least one target object.

20. The method of claim 11, wherein:
the portion of the plurality of proposals selected by the proposal selection model is approximately 25-50% of the plurality of proposals.

* * * * *